(12) United States Patent
Briglia et al.

(10) Patent No.: US 10,571,043 B2
(45) Date of Patent: Feb. 25, 2020

(54) PRESS FIT VALVE ADAPTATION FOR TOP ENTRY VALVE IN CRYOGENIC SERVICE

(71) Applicants: L'Air Liquide, Societe Anonyme pour l'Etude et l'Exploitation des Procedes Georges Claude, Paris (FR); Alain Briglia, Hangzhou (CN); Jianwei Li, Hangzhou (CN)

(72) Inventors: Alain Briglia, Hangzhou (CN); Jianwei Li, Hangzhou (CN)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 12 days.

(21) Appl. No.: 15/775,282

(22) PCT Filed: Nov. 10, 2015

(86) PCT No.: PCT/CN2015/094206
§ 371 (c)(1),
(2) Date: May 10, 2018

(87) PCT Pub. No.: WO2017/079898
PCT Pub. Date: May 18, 2017

(65) Prior Publication Data
US 2018/0372241 A1    Dec. 27, 2018

(51) Int. Cl.
*F16K 43/00* (2006.01)
*F16K 27/02* (2006.01)
*F17C 13/04* (2006.01)

(52) U.S. Cl.
CPC .............. *F16K 43/00* (2013.01); *F16K 27/02* (2013.01); *F17C 13/04* (2013.01)

(58) Field of Classification Search
CPC .......... F16K 27/08; F16K 43/00; F16K 27/02; F17C 13/04; Y10T 137/6065; Y10T 137/0402; Y10T 137/0491
See application file for complete search history.

(56) References Cited

U.S. PATENT DOCUMENTS 4,285,498 A    8/1981  Nightingale
4,641,681 A    2/1987  Ikematsu et al.
(Continued)

FOREIGN PATENT DOCUMENTS

CN    104089044    10/2014
EP    1 936 255    6/2008
(Continued)

OTHER PUBLICATIONS

International Search Report and Written Opinion for corresponding PCT/CN2015/094206, dated Aug. 17, 2016.
(Continued)

*Primary Examiner* — Eric Keasel
*Assistant Examiner* — Kevin R Barss
(74) *Attorney, Agent, or Firm* — Elwood L. Haynes

(57) ABSTRACT

A press-fit in situ retrofit assembly for a top entry valve and a method thereof are disclosed. The assembly includes an annular conduit (201) including a segment (202) of reduced outside diameter and a shoulder (203) on the exterior surface at the proximal end (204), and is configured to conform with an interior surface (205) of a valve seat (206) at the distal end (207). A valve body extension (208) with an interior annular region (301), and an inlet port (209) fluidically connected to the annular region (301). A gland packing push plate (211) is configured to allow the annular conduit (201) to pass through thereby forming an outlet port (212). And a thrust plate (403) is attached to the thrust screws (401). The thrust plate (403) allows the segment (202) of reduced
(Continued)

outside diameter at the proximal end (204) of the annular conduit (201) to pass through, with the thrust plate (403) seating on the shoulder (203). The assembly and the method allow the removal of a portion of the fluid from the cold box for downstream processing or manipulation as desired.

10 Claims, 5 Drawing Sheets

(56) References Cited

U.S. PATENT DOCUMENTS

| | | | |
|---|---|---|---|
| 4,815,692 A | | 3/1989 | Loiseau et al. |
| 4,844,411 A | | 7/1989 | Nelson |
| 5,013,009 A | | 5/1991 | Nelson |
| 5,476,117 A | * | 12/1995 | Pakula ................. F16K 41/026 |
| | | | 137/312 |
| 6,098,674 A | | 8/2000 | Germain et al. |
| 6,302,374 B1 | | 10/2001 | Fink |
| 7,284,570 B1 | | 10/2007 | Gracik et al. |
| 2006/0005792 A1 | * | 1/2006 | Bosler ................... B23K 11/26 |
| | | | 123/41.41 |
| 2008/0023663 A1 | * | 1/2008 | Pereira Madeira ..... F02D 9/103 |
| | | | 251/301 |

FOREIGN PATENT DOCUMENTS

| | | |
|---|---|---|
| FR | 2 799 523 | 12/2001 |
| WO | WO 2014 021509 | 2/2014 |

OTHER PUBLICATIONS

International Search Report and Written Opinion for related PCT/CN2015/094207, dated Mar. 29, 2016.

* cited by examiner

PRESS FIT VALVE ADAPTATION FOR TOP ENTRY VALVE IN CRYOGENIC SERVICE

CROSS REFERENCE TO RELATED APPLICATIONS

This application is a § 371 of international PCT application PCT/CN2015/094206, filed Nov. 10, 2015, which is herein incorporated by reference in its entirety.

BACKGROUND

Valves are commonly used in industry to restrict, divert, or blend flows of fluids. In the cryogenic industry, "top entry" valves are commonly used. These top entry valves present the advantage of eliminating flange connections (i.e. between the valve body and the bonnet), which represent a risk of leakage. Consequently, valves of this type eliminate the separate casing typically found in conventional valves, typically filled with mineral wool, thereby allowing for easy access to the valve internals in the case of leakage.

The absence of the separate casing filled with mineral wool implies that the valve and the connecting piping will need to be externally insulated, typically by being immersed with perlite inside the cryogenic cold box. This makes accessing the piping connected to the valve body virtually impossible, except by emptying the cold box of the perlite. This is a time consuming and expensive operation, resulting in extended plant outages.

In some cases, it can be desirable to access a stream internal to the cold box itself. For example, if the addition of a Helium-Neon enrichment column is envisioned. In the case where a top entry valve is in an appropriate location within the process cycle, the proposed invention would allow the top entry valve to be modified, in situ, to provide an exit and entry port for this process stream.

SUMMARY

A press-fit in situ retrofit assembly for a top entry valve is provided. The assembly includes a top entry valve body comprising a bonnet, stem, and plug, wherein the bonnet, stem, and plug have been removed in situ. An annular conduit with an exterior surface is disposed longitudinally within the top entry valve body. The annular conduit includes a segment of reduced outside diameter and a shoulder on the exterior surface at the proximal end, and is configured to conform to an interior surface of a valve seat at the distal end. A valve body extension is configured to attach to the top entry valve body concentric with the annular conduit. The valve body extension includes an interior annular region, an inlet port fluidically connected to the annular area, and a gland packing configured to seal against the annular conduit. A gland packing push plate is configured to allow the annular conduit to pass through thereby forming an outlet port. The gland packing push plate includes a plurality of thrust screws configured to conform to holes in a thrust plate, the gland packing push plate configured to form a fluid tight seal with the gland packing. And a thrust plate assembly including the thrust plate, and a plurality of thrust nuts. The thrust plate is fixedly attached to the gland packing push plate by means of the thrust nuts attaching to the thrust screws penetrating the thrust plate. The thrust plate is configured to allow the segment of reduced outside diameter at the proximal end of the annular conduit to pass through, with the thrust plate seating on the shoulder.

A method of press fitting in situ a retrofit assembly for a top entry valve, using the above assembly is provided. This includes tightening the thrust nuts, thereby forcing the thrust plate against the shoulder and forcing the annular conduit into contact with the valve seat, and producing an interference fit between the distal end of the annular conduit and the valve seat.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
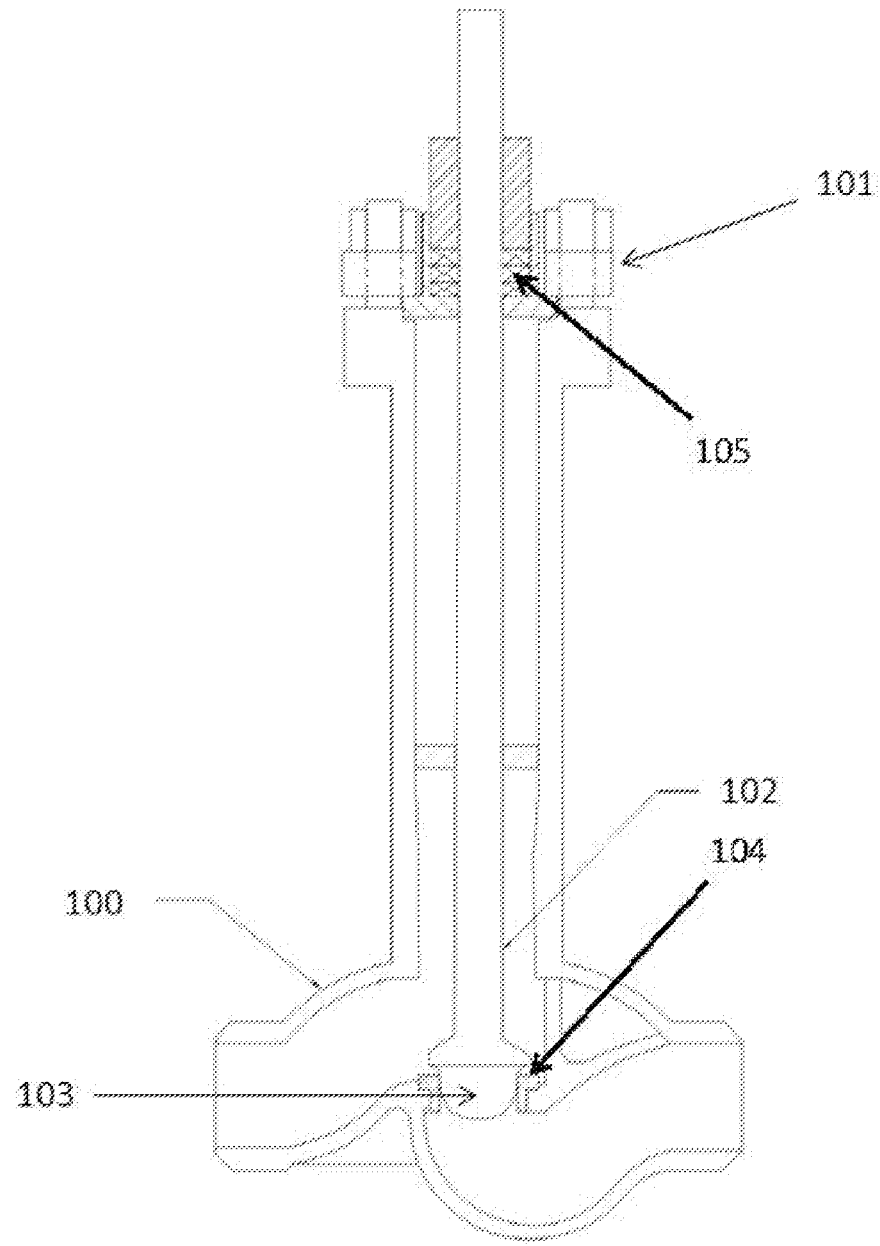
FIG. 1 illustrates a typical top entry valve as known to the prior art.
Figure 2:
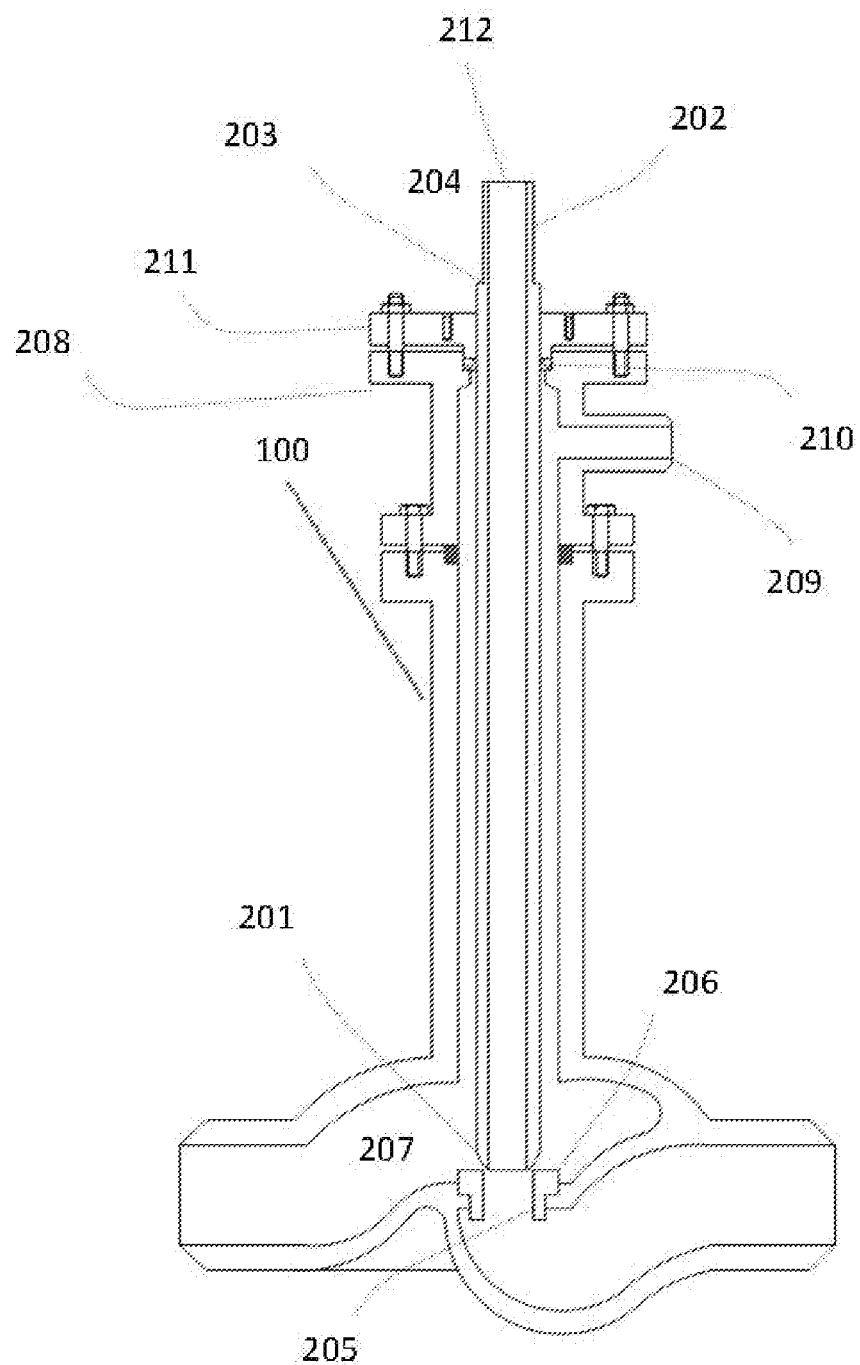
FIG. 2 illustrates one embodiment of the present invention.
Figure 3:
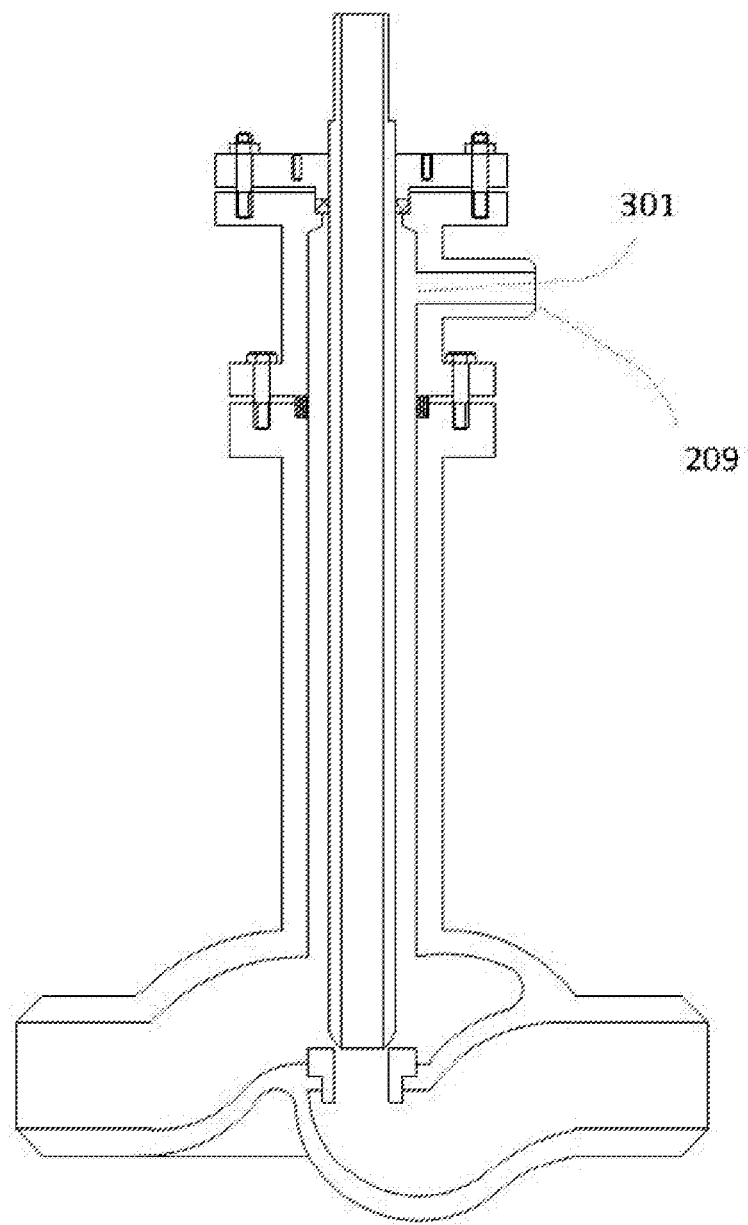
FIG. 3 illustrates another embodiment of the present invention.
Figure 4:
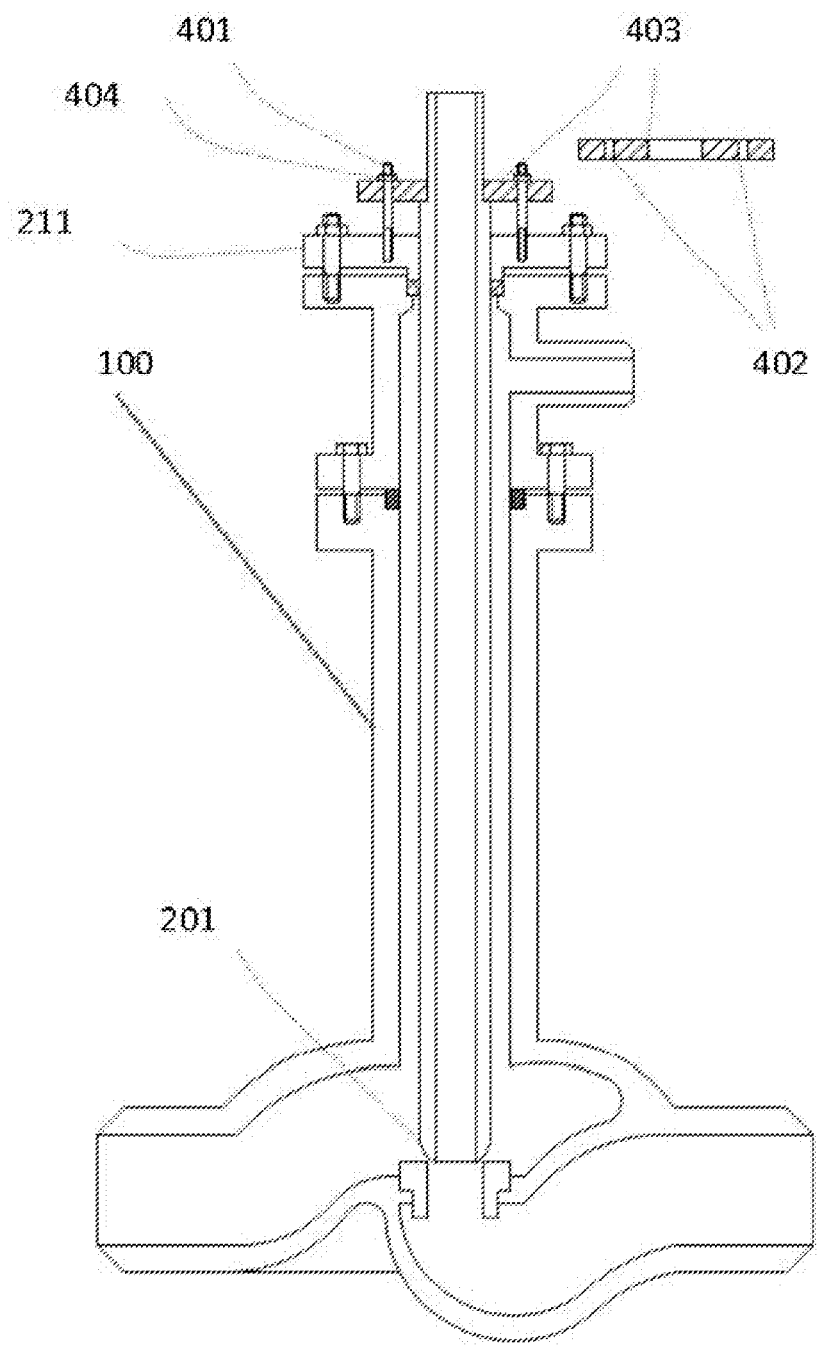
FIG. 4 illustrates another embodiment of the present invention.
Figure 5:
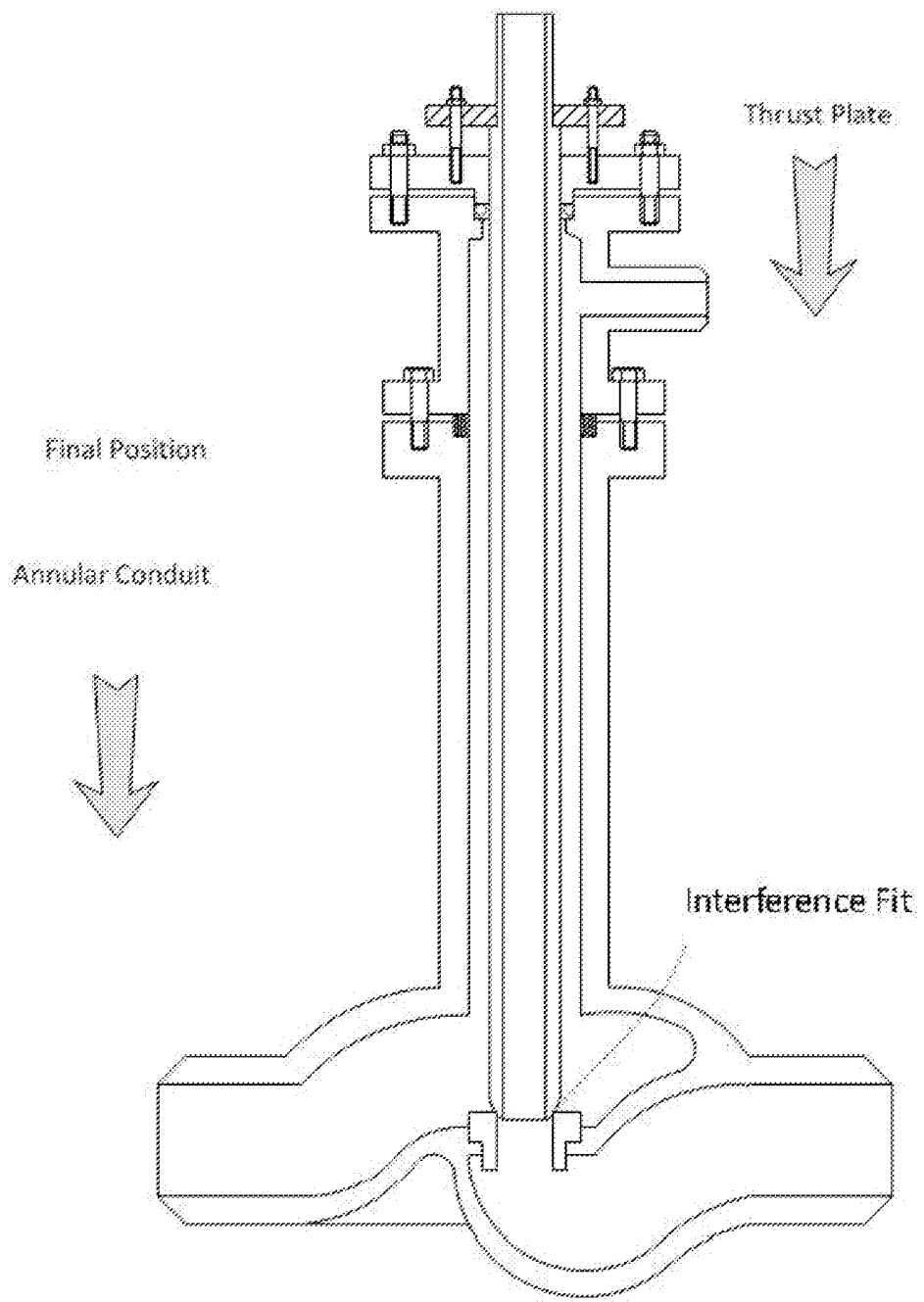
FIG. 5 illustrates another embodiment of the present invention.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning to FIG. 1, a typical top entry valve used for cryogenic service is presented. As the name would suggest, this type of valve allows the internal parts to be accessed through the top, without having to completely remove the valve. A top entry globe valve will have a bonnet (101) which is bolted to the body and is removed to gain access. This valve will also have a valve stem (102) which passes through the bonnet, typically to a hand-wheel or other controlling means, and transmits linear motion to a valve member, such as the plug (103) of a globe valve. The plug (103) makes contact with the valve seat (104) thereby forming a leak-tight closure that stops the fluid flow through the valve. In order to prevent unwanted fluid leakage through the bonnet, typically a friction tolerant seal, such as packing (105) will be pressed into annular recesses known as glands.

Turning to FIGS. 2 through 5, a top entry valve is shown with the original bonnet, stem and pug removed. These may be removed in situ, without having to remove the valve from the interconnected piping. If this valve is in cryogenic service, it will be imbedded within the cold box with only the top part of the valve body and the bonnet penetrating the cold box and being readily accessible. The rest of the cryogenic valve, will be surrounded by the cryogenic insulation (cryogel, perlite, etc), which would make removal of the valve body itself time consuming and expensive.

Inside the now empty valve body, an annular conduit (201) is introduced. The annular conduit (201) has an exterior surface disposed longitudinally within the top entry valve body (100), in a similar orientation as the valve stem had previously occupied. The annular conduit (201) has a segment (202) of reduced outside diameter and a shoulder (203) on the exterior surface at the proximal end (204). The annular conduit (201) is configured to conform to the interior surface (205) of the valve seat (206) at the distal end (207). The distal end of the annular conduit (201) may have a conical shape, which will allow it to interface and fit snugly within the valve seat (206).

A valve body extension (208) is configured to attach to the top entry valve body (100) concentric with the annular conduit (201). The valve body extension (208) has an interior annular region (301), an inlet port (209) fluidically connected to the annular area (301), and a gland packing (210) configured to seal against the annular conduit (201). The valve body extension (208) has an internal volume (301) that is fluidically connected to the downstream portion of the top entry valve body. Hence, a fluid that is introduced into the inlet port (209) will pass around the annular conduit (201) within the valve body, and then proceed to exit the top entry valve, though a first fluid path.

A gland packing push plate (211) is configured to allow the annular conduit (201) to pass through thereby forming an outlet port (212). The outlet port (212) is fluidically connected to the upstream portion of the top entry valve body. Hence, a fluid that is introduced into the inlet side of the main valve body will pass through the annular conduit (201) and exit the outlet port (212), through a second fluid path. A gland packing push plate configured to form a fluid tight seal with the gland packing (210).

The gland packing push plate (211) has a plurality of thrust screws (401) that are configured to conform to holes (402) in a thrust plate (403). The thrust plate assembly includes the thrust plate (403), and a plurality of thrust nuts (404). The thrust plate (403) is fixedly attached to the gland packing push plate (211) by means of the thrust nuts (404) attaching to the thrust screws (401) penetrating the thrust plate (403). The thrust plate (403) is configured to allow the segment of reduced outside diameter (202) at the proximal end (204) of the annular conduit (201) to pass through, with the thrust plate (211) seating on the shoulder (203).

The thrust plate (403) sits on the shoulder (203) at the top (proximal end) of the annular conduit. The bottom (distal end) of the annular conduit is in contact with the valve seat (206). As the thrust nuts (404) are sequentially tightened, the annular conduit (201) moves in the direction of the valve seat (206). The distal end of the annular conduit (201) is forced into an interference fit inside the valve seat (206). This forms a fluid tight seal thereby allowing fluid flowing through the first fluid path and fluid flowing through the second fluid path to remain completely independent and unmixed.

This then allows the removal of a portion of the fluid from the cold box (second fluid path), for downstream processing or manipulation as desired. Then at least a portion of this processed stream, or possibly an entirely unrelated stream, may then be returned to the cold box (first fluid path). The inlet port may be connected to cryogenic service. The outlet port may be connected to cryogenic service.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A press-fit in situ retrofit assembly for a top entry valve, comprising:
    a top entry valve body (100) comprising a bonnet (101), stem (102), and plug (103), wherein the bonnet, stem, and plug have been removed in situ,
    an annular conduit (201) with an exterior surface disposed longitudinally within the top entry valve body (100), the annular conduit (201) comprising segment (202) of reduced outside diameter and a shoulder (203) on the exterior surface at the proximal end (204), the annular conduit (201) configured to conform with an interior surface (205) of a valve seat (206) at the distal end (207),
    a valve body extension (208) configured to attach to the top entry valve body (100) concentric with the annular conduit (201), wherein the valve body extension (208) comprises an interior annular region (301), an inlet port (209) fluidically connected to the annular area (301), and a gland packing (210) configured to seal against the annular conduit (201),
    a gland packing push plate (211) configured to allow the annular conduit (201) to pass through thereby forming an outlet port (212), the gland packing push plate (211) comprising a plurality of thrust screws (401) configured to conform with holes (402) in a thrust plate (403), the gland packing push plate configured to form a fluid tight seal with the gland packing (210), and
    a thrust plate assembly comprising the thrust plate (403), and a plurality of thrust nuts (404),
        the thrust plate (403) fixedly attached to the gland packing push plate (211) by means of the thrust nuts (404) attaching to the thrust screws (401) penetrating the thrust plate (403),
        the thrust plate (403) configured to allow the segment of reduced outside diameter (202) at the proximal end (204) of the annular conduit (201) to pass through, with the thrust plate (211) seating on the shoulder (203).

2. The in situ retrofit assembly for a top entry valve of claim 1, wherein the top entry valve body is installed in cryogenic service.

3. The in situ retrofit assembly for a top entry valve of claim 1, wherein the inlet port is connected to cryogenic service.

4. The in situ retrofit assembly for a top entry valve of claim 1, wherein the outlet port is connected to cryogenic service.

5. The in situ retrofit assembly for a top entry valve of claim 1, wherein the distal end of the annular conduit has a conical shape.

6. A method for press-fitting in situ a retrofit assembly for a top entry valve, comprising:

providing a top entry valve body comprising a bonnet, stem and plug, wherein the bonnet, stem, and plug have been removed in situ, providing an annular conduit with an exterior surface disposed longitudinally within the top entry valve body, the annular conduit comprising segment of reduced outside diameter and a shoulder on the exterior surface at the proximal end, and the annular conduit configured to conform with an interior surface of a valve seat at the distal end, providing a valve body extension configured to attach to the top entry valve body concentric with the annular conduit, wherein the valve body extension comprises an interior annular region, an inlet port fluidically connected to the annular area, and a gland packing configured to seal against the annular conduit, providing a gland packing push plate configured to allow the annular conduit to pass through thereby forming an outlet port, the gland packing push plate comprising a plurality of thrust screws configured to conform with holes in a thrust plate, the gland packing push plate configured to form a fluid tight seal with the gland packing, and providing a thrust plate assembly comprising the thrust plate, and a plurality of thrust nuts, passing the segment of reduced outside diameter at the proximal end of the annular conduit through the holes in the thrust plate fixedly attaching the thrust plate to the gland packing push plate by means of the thrust nuts attaching to the thrust screws penetrating the thrust plate, tightening the thrust nuts, thereby forcing the thrust plate against the shoulder and forcing the annular conduit into contact with the valve seat, and producing an interference fit between the distal end of the annular conduit and the valve seat.

7. The method for press-fitting in situ a retrofit assembly for a top entry valve of claim 6, wherein the top entry valve body is installed in cryogenic service.

8. The method for press-fitting in situ a retrofit assembly for a top entry valve of claim 6, wherein the inlet port is connected to cryogenic service.

9. The method for press-fitting in situ a retrofit assembly for a top entry valve of claim 6, wherein the outlet port is connected to cryogenic service.

10. The method for press-fitting in situ a retrofit assembly for a top entry valve of claim 6, wherein the distal end of the annular conduit has a conical shape.

* * * * *